United States Patent [19]

Cho

[11] Patent Number: 5,398,903

[45] Date of Patent: Mar. 21, 1995

[54] VIDEO DISPLAY MOUNTING DEVICE

[75] Inventor: Chilhong Cho, Kyungsangnam-do, Rep. of Korea

[73] Assignee: Samsung Display Devices Co., Ltd., Hwasung-kun, Rep. of Korea

[21] Appl. No.: 87,992

[22] Filed: Jul. 2, 1993

[30] Foreign Application Priority Data

Jul. 7, 1992 [KR] Rep. of Korea ............... 1992/12478

[51] Int. Cl.⁶ ........................................... A47B 91/00
[52] U.S. Cl. ................................. 248/349; 248/921; 248/371; 248/187
[58] Field of Search ............... 248/349, 346, 917, 919, 248/920, 921, 922, 923, 371, 183

[56] References Cited

U.S. PATENT DOCUMENTS

| | | | |
|---|---|---|---|
| 4,533,105 | 8/1985 | Cornwell, Jr. et al. | 248/371 |
| 4,554,590 | 11/1985 | Chelin et al. | 248/371 X |
| 4,562,988 | 1/1986 | Bumgardner | 248/349 |
| 4,564,166 | 1/1986 | Craft et al. | 248/183 X |
| 4,591,120 | 5/1986 | Bryant-Jeffries et al. | 248/921 X |
| 4,591,123 | 5/1986 | Bradshaw et al. | 248/921 X |
| 4,738,422 | 4/1988 | Matheson et al. | 248/921 X |
| 4,880,191 | 11/1989 | Lake, Jr. | 248/371 |
| 5,102,082 | 4/1992 | Bang | 248/921 X |
| 5,145,134 | 9/1992 | Hashimoto et al. | 248/371 X |
| 5,209,446 | 5/1993 | Kawai | 248/923 X |

FOREIGN PATENT DOCUMENTS 8600507  1/1986  WIPO ..................... 248/349

*Primary Examiner*—Karen J. Chotkowski
*Attorney, Agent, or Firm*—Christie, Parker & Hale

[57] ABSTRACT

A video display unit such as a monitor of cathode-ray tubes has a mechanism in which its swivelling and tilting can be adjusted by a user. The display unit has a stable posture independently, when the display unit is separated from a stand including a truncated member having a partial spherical section downwardly protruded, the partial spherical section being located at the inner side of the opening of the bottom cover, and a socket for supporting the display unit while tilting and swivelling.

10 Claims, 4 Drawing Sheets

VIDEO DISPLAY MOUNTING DEVICE

BACKGROUND OF THE INVENTION (1) Field of the Invention

This invention relates to a video display mounting device providing swivelling and tilting and, more particularly, to a video display mounting device which is capable of keeping stable posture of a lay unit, independently, when the display unit is separated from a stand.

(2) Description of the Background Art

Generally, a video display, such as a monitor of cathode-ray tubes (CRT), has a mechanism in which swivelling and tilting can be adjust by a user.

Examples of some of these related art mounting devices can be found in the following U.S. Pat. Nos. 4,554,590; 4,562,988; and 4,880,191.

All of the aforementioned related arts are relative to a display unit having a partial spherical member protruded from the lower part of the display unit for tilting and swivelling.

However, in such related arts, when a user wants to use the display unit, independently, the display unit has a problem in that it cannot be positioned stably for its protruded partial sphere. A user must separate the partial spherical member from the display unit.

SUMMARY OF THE INVENTION

Therefore, the present invention has been made in an effort to solve the above-described problem.

An object of the present invention is to provide a video display mounting device allowing a swivelling and tilting of the display unit while also providing a stable posture for the display unit independently when it is separated from the stand.

To achieve the above object, the present invention provides a device for mounting a display unit on a base unit providing tilting and swivelling. The display unit, including a bottom cover having an opening, comprises: a truncated member having a partial spherical section downwardly protruded, the partial spherical section being located at the inner side of the opening of the bottom cover; a socket for swivelly and swivelly supporting the display unit while tilting and swivelling, the socket being mated against a lower surface of the partial spherical section; and a fixing means including a nut member located at the inner side of the socket for slidably engaging the truncated member with the socket and a locking member located on a lower surface of the socket. The truncated member includes an elongated slot. An upstanding annular wall of the socket penetrates the elongated slot. The nut member includes an axle inserted into an inner side of the upstanding annular wall. The locking member connects the nut member with the socket, and the truncated member is slidably located between the socket and the nut member.

BRIEF DESCRIPTION OF THE DRAWINGS

The present invention will become more fully understood from the detailed description given herein below and the accompanying drawings which are given by way of illustration only, and thus do not limit the scope of the present invention.

DETAILED DESCRIPTION OF THE PREFERRED EMBODIMENTS

Figure 1:
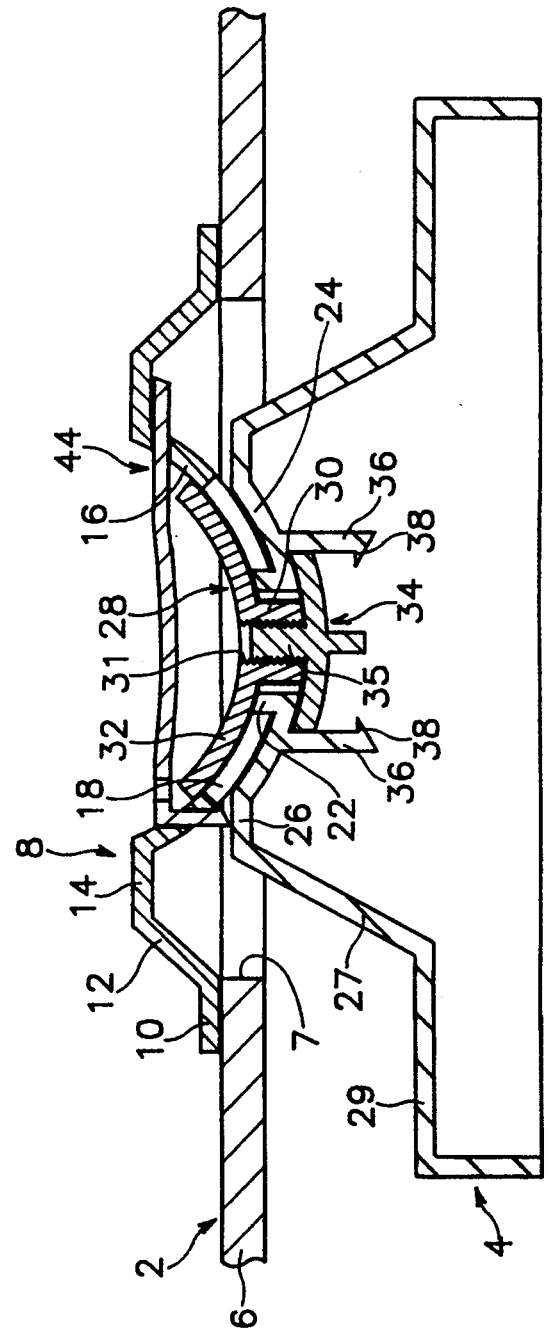
FIG. 1 is a side sectional view of a display unit mounted to a base unit of an embodiment of the present invention.
Figure 2:
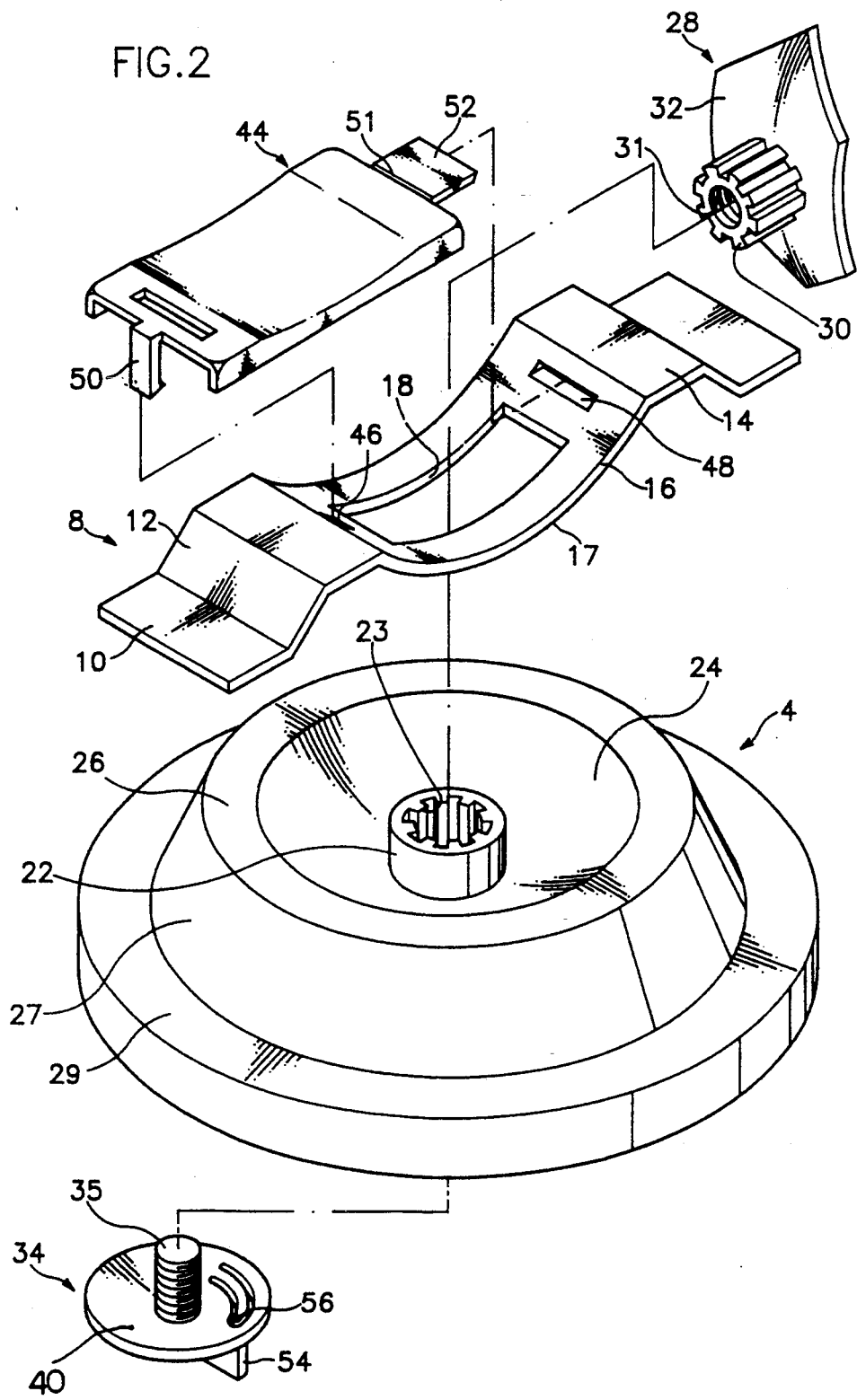
FIG. 2 is an exploded perspective view of a mounting device of an embodiment of the present invention.

FIG. 1 is a side sectional view of a display unit mounted to a base unit of an embodiment of the present invention. FIG. 2 is an exploded perspective view of a mounting device of an embodiment of the present invention, wherein a display unit 2 and a base unit 4 that tilts and swivels are illustrated.

The display unit 2 includes a bottom cover 6 having a partial opening 7. A truncated member 8 is fixed to the inner side of the opening 7.

The truncated member 8 includes a flange 10 fixed to the bottom cover 6, a space maintaining section 12 protruded from the flange 10 and extended to the inner side of the display unit 2, a flat surface 14 extended from the space maintaining section 12, and a partial spherical section 16 protruded from a center portion of the flat surface 14 to the outer side of the display unit 2.

A lowest bottom point of the partial spherical section 16 preferably lies on the same horizontal as the bottom cover 6, or lies on the inner side of the bottom cover 6 to provide a stable posture for the display unit 2 when separated from the base unit 4.

An elongated slot 18 is formed in a center portion of the partial spherical section 16. An upstanding annular wall 22 of the base unit 4 is inserted into the elongated slot 18.

The upstanding annular wall 22 is protruded from a center portion of a socket 24. The socket 24 mates against the partial spherical section 16.

The base unit 4 includes a first flat surface 26 extended from the socket 24, a slant 27 downwardly extended from the first flat surface 26 and a second flat surface 29 extended from the slant 27. To prevent interference in tilting and swivelling, a predetermined space is formed between the slant 27 and the opening 7 of the bottom cover 6 and between the second flat surface 29 and the bottom cover 6, respectively.

The inner surface of the upstanding annular wall 22 is provided with the spline groove 23 and a nut member 28 is inserted into the spline groove 23, so that the nut member 28 can not be circularly rotated but axially displaced.

The nut member 28 has a spline axle 30 to engage with the spline groove 23 and a semi-spherical plate 32 mating with the inner surface of the partial spherical section 16 to prevent the display unit 2 from being shaken.

The spline axle 30 which is provided with a screw thread 31 at its inner side is fixedly engaged with the screw axle 35 of the locking member 34, so that the partial spherical section 16 can be slidably located between the semi-spherical plate 32 and the socket 24.

Two tabs 36 are downwardly protruded from the lower surface of the socket 24 to prevent the locking member 34 from being freely broken away when the locking member 34 is unscrewed. On the lower end of each tab 36 is formed a lip 38.

The lip 38 is projected to a place on which a flange 40 of the locking member 34 can be hung, thereby preventing the locking member 34 from being broken away. (see FIG. 3).

The two tabs 36 are formed facing each other. A projection 42 is preferably formed on the same circular pattern as the lip 38 in such a manner that the locking member 34 cannot be displaced left and right.

The length of the tab 36 is defined to permit the locking member 34 to downwardly move when the locking member 34 is disengaged from the spline axle 30.

Since the truncated member 8 has a shape in which the partial spherical section 16 opened upwardly, the nut member 28 may move into the inner side of the display unit 2 when the locking member 34 is disengaged from the spline axle 30. To prevent the nut member 28 from moving as described, the partial spherical section 16 is designed to be covered with a cover member 44.

As shown in FIG. 2, holes 46 and 48 are formed in the partial spherical section 16 to open and close the cover member 44 as needed. The tabs 50 and 52 to be inserted into holes 46 and 48, respectively, are provided at either end of the cover member 44.

The hole 48 is formed in a slit shape. A thickness of the tab 52 formed on one end of the cover member 44 is defined such that the tab 52 can be inserted into the slit. Further, an undercut 51 is formed on a boundary portion between the cover member 44 and the tab 52, so that the tap 52 is designed to be folded in the state where the tab 52 is positioned at the inner side of the truncated member 8.

The tab 50, a hook member for which a fixed state is maintained by being hung on the hole 46, is formed on the other end of the cover member 44.

Figure 3:
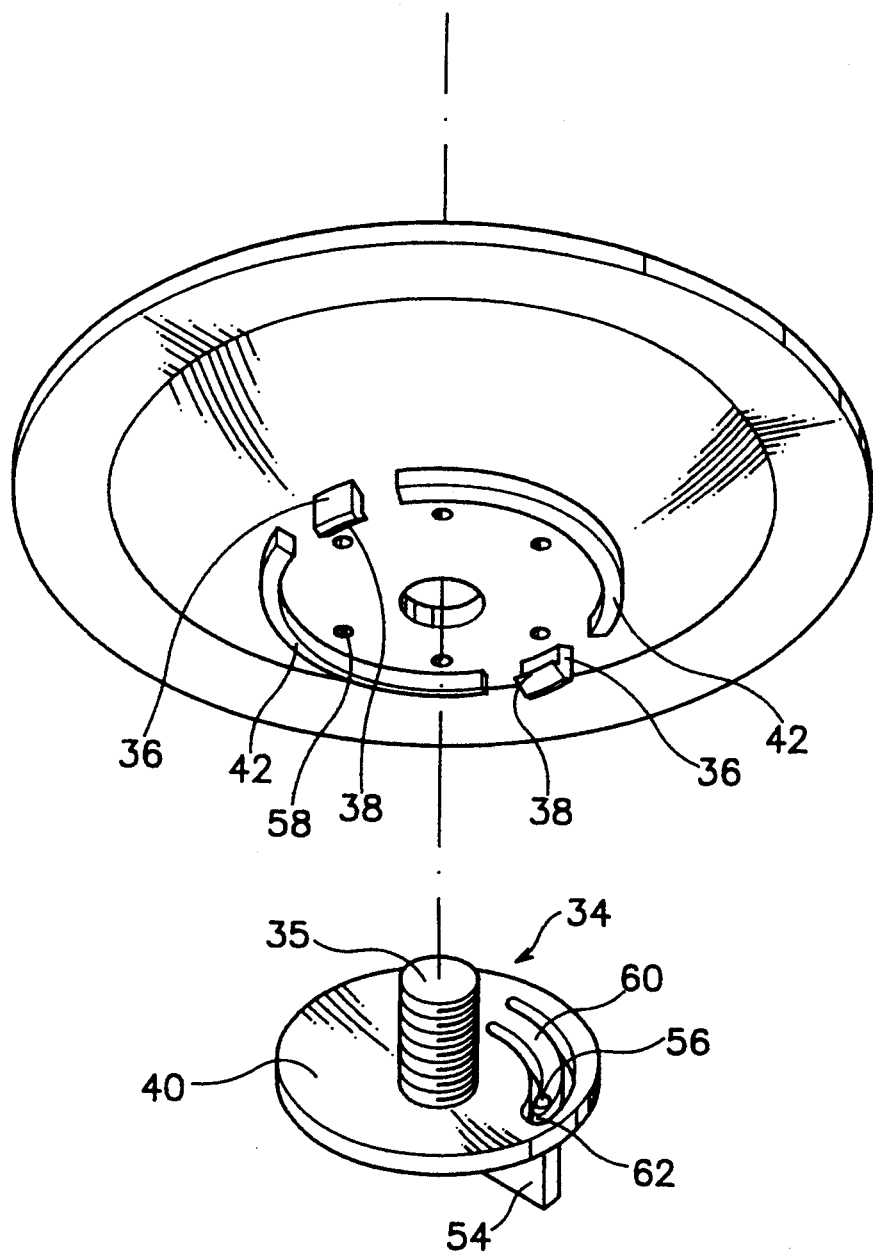
FIG. 3 is an exploded perspective view showing a state before the socket and the locking member are assembled together according to an embodiment of the present invention.

FIG. 3 is an exploded perspective view showing a state before the socket 24 and the locking member 34 are assembled with each other according to an embodiment of the present invention.

On the flange 40 of the locking member 34 is formed a handle 54 for a use in the case of a screw engagement or disengagement. And also, a stopper 56 is formed on the flange 40 to prevent the locking member 34 from being disengaged by external impacts.

The stopper 56 may be elastically inserted into one of plurality of grooves 58 formed on a lower surface of the socket 24. In an embodiment of the present invention, an elastic section 60 is formed on the flange by partial cutting, and the stopper 56 is formed on a free end 62 of the elastic section 60.

Figure 4:
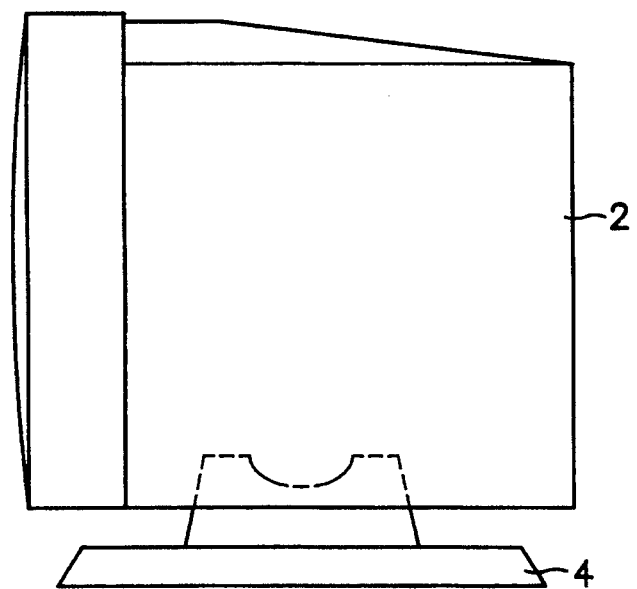
FIG. 4 is a schematic view showing a display unit mounted to a base unit according to an embodiment of the present invention.

In the above-described video display mounting device as shown in FIG. 4, when the display unit 2 is mounted on the base unit 4, the display unit 2 can swivel about a center at the socket 24. Further, since the truncated member 8 is in a state where the upstanding annular wall 22 of the socket 24 is inserted into the elongated slot 18, it is possible for the display unit 2 to tilt.

Further, in the case that the display unit 2 is a large size monitor, only the display unit 2 may be used as needed. To separate the display unit 2 from the base unit 4, the locking member 34 is disengaged from the socket 34. The locking member 34 drops as an independent part due to gravity and the flange 40 of the locking member 34 is hung on the lips 38 of tabs 36 formed on the lower surface of the socket 24, thereby preventing the locking member 34 from being lost.

Following the above operation, the display unit is lifted. Since the nut member 28 and the socket 24 are engaged with each other by a spline engagement, the display unit is easily separated from the base unit 4.

Figure 5:
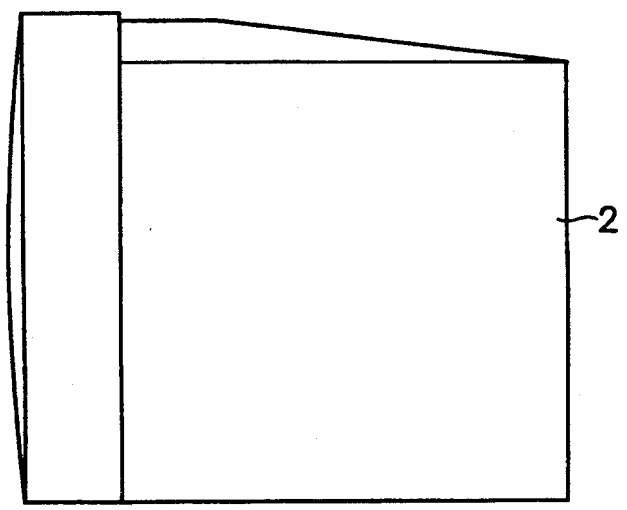
FIG. 5 is a schematic view showing a posture of a display unit when it is separated from a base unit according to an embodiment of the present invention.

In a state where the display unit is separated from the base unit 4, since no portion protrudes from the bottom cover 6 of the display unit 2 a stable posture can be maintained as shown in FIG. 5.

Further, the base unit 4 has the socket 24 with the groove 58 and stopper 56 elastically located on the groove 58 such that disengagement of the locking member 34 caused by external impacts can be prevented thereby maintaining a secure locking state.

What is claimed is:

1. A device for mounting a display unit to a base unit providing tilting and swivelling, the display unit including a bottom cover having an opening, wherein the device comprises:

a truncated member having a partial spherical section protruding downward;

a socket mated against a lower surface of said partial spherical section to support the truncated member; and fixing means fixing the truncated member to the socket for tilting and swivelling of the display unit; wherein said truncated member comprising a flange integrally fixed to an inner side surface of said bottom cover through the opening, a space maintaining section which extends from said flange to an inner side of the display unit such that a lowermost point of the spherical section does not protrude out of said opening, and a flat surface extending from the space maintaining section, which is parallel to the bottom cover and on which the spherical section is integrally formed.

2. The device of claim 1, wherein said spherical section is provided with an elongated slot, said socket is provided with an upstanding annular wall penetrating the elongated slot, and said fixing means includes a nut member disposed on the spherical section and having an axle inserted into the elongated slot and upstanding annular wall and a locking member disposed on a lower surface of the socket and engaged with the axle of the nut member such that the spherical section is located between the nut member and socket.

3. The device as set forth in claim 2, wherein said socket comprises a tab extending from the lower surface of the socket downward and a lip formed on a lower end of the tab for preventing said locking member from being freely broken away when disassembling the device.

4. The device as set forth in claim 2, wherein said locking member further comprises a flange for mating against the lower surface of said socket.

5. The device as set forth in claim 4, wherein said flange is provided with a stopper to prevent said locking member from being disengaged by an external impact.

6. The device as set forth in claim 5, wherein said flange of the locking member is provided with an elastic section thereon and the stopper is formed on an end of said elastic section for elastically contacting the lower surface of the socket.

7. The device as set forth in claim 5, wherein the lower surface of the socket is provided with a plurality of grooves in which said stopper is inserted.

8. The device as set forth in claim 2, wherein the nut member is engaged with the upstanding annular wall by a spline engagement to provide a movement only in an axial direction.

9. The device as set forth in claim 1, wherein said truncated member includes a cover member mounted on an upper portion of said truncated member.

10. The device as set forth in claim 9, wherein said cover member includes a lip and a hook formed on both ends of said cover member to be connected to said truncated member.

* * * * *

UNITED STATES PATENT AND TRADEMARK OFFICE
CERTIFICATE OF CORRECTION

PATENT NO. : 5,398,903
DATED : March 21, 1995
INVENTOR(S) : Chilhong Cho

It is certified that error appears in the above-indentified patent and that said Letters Patent is hereby corrected as shown below:

```
Column 1, line 10, change "lay unit" to
          -- display unit --.
Column 1, line 15, change "adjust" to -- adjusted --.
Column 1, line 45, delete "swivelly and swivelly".

Column 2, line 32, change "lowest" to -- lowermost --.

Column 3, line 6, after "away" delete the period.
Column 3, line 16, change "opened" to -- opens --.
Column 3, line 34, change "tap" to -- tab --.
Column 3, line 45, after "54 for" delete "a".
Column 3, line 46, change "disengagement. And also," to
          -- disengagement. Also, --.
Column 3, line 66, change "34" to -- 24 --. (1st occurrence)
```

Signed and Sealed this

Second Day of January, 1996

Attest:

BRUCE LEHMAN

*Attesting Officer*   *Commissioner of Patents and Trademarks*